Nov. 9, 1948.  D. J. DAVIS  2,453,306
APPARATUS FOR MEASURING WALL THICKNESS
OF PROPELLER BLADES
Filed May 24, 1945  10 Sheets-Sheet 1
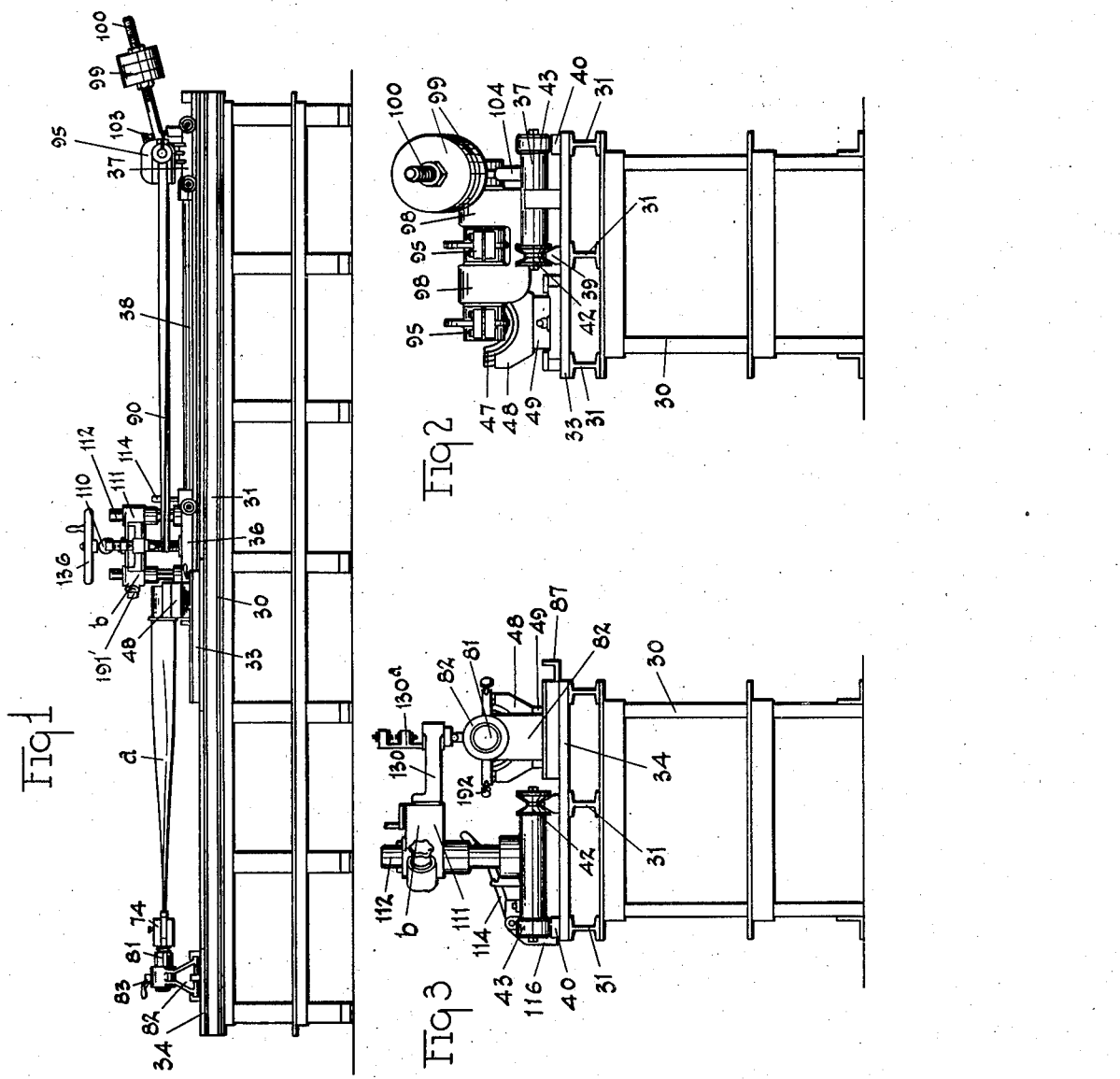
INVENTOR.
Dwillard J. Davis
BY Fred Gerlach
His Attorney Nov. 9, 1948.  D. J. DAVIS  2,453,306
APPARATUS FOR MEASURING WALL THICKNESS
OF PROPELLER BLADES
Filed May 24, 1945  10 Sheets-Sheet 2
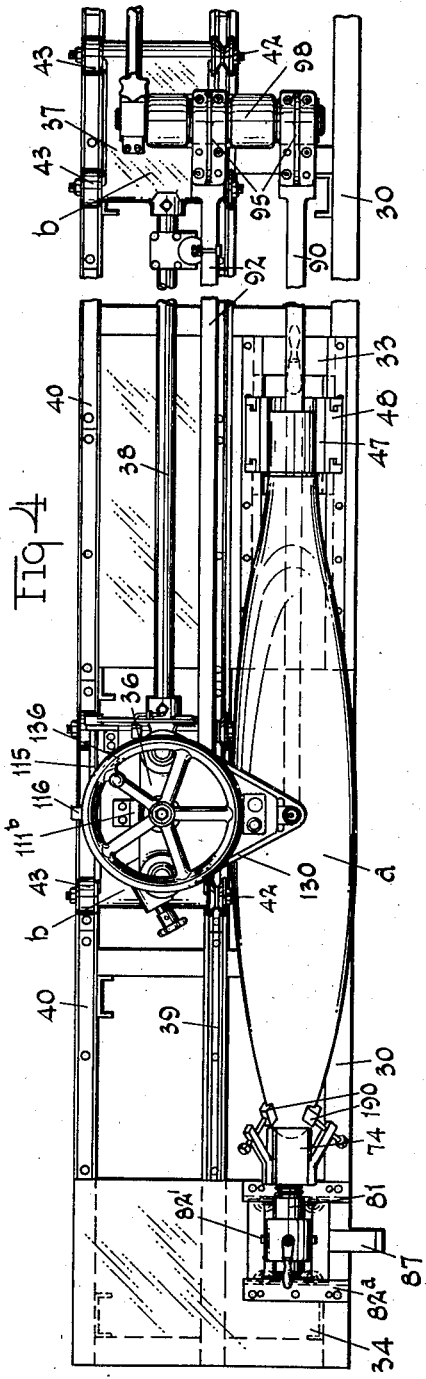
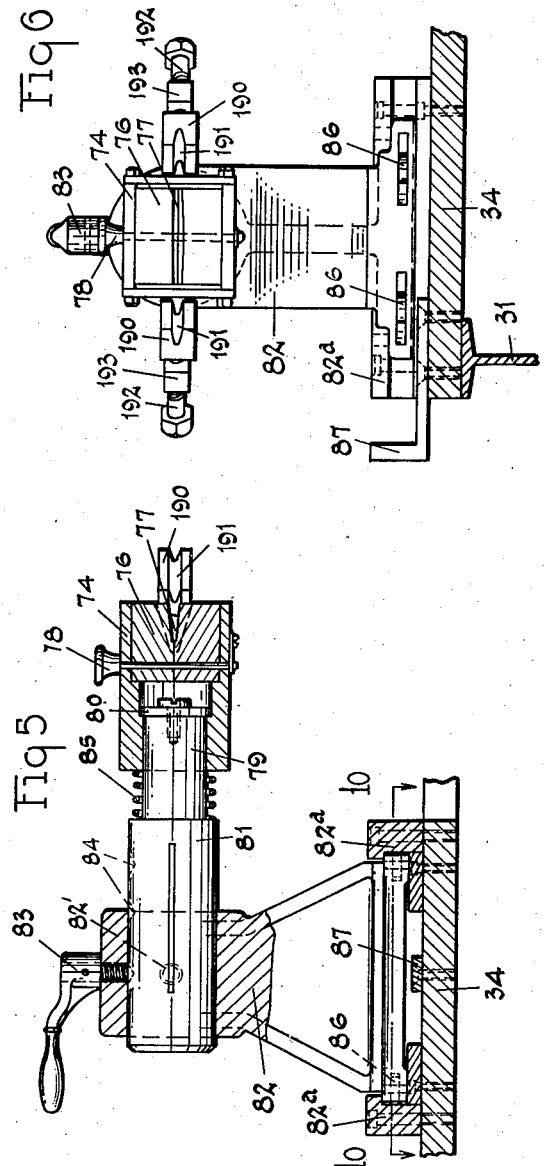
INVENTOR.
Dwillard J. Davis
BY
Fred Gerlach
his Attorney

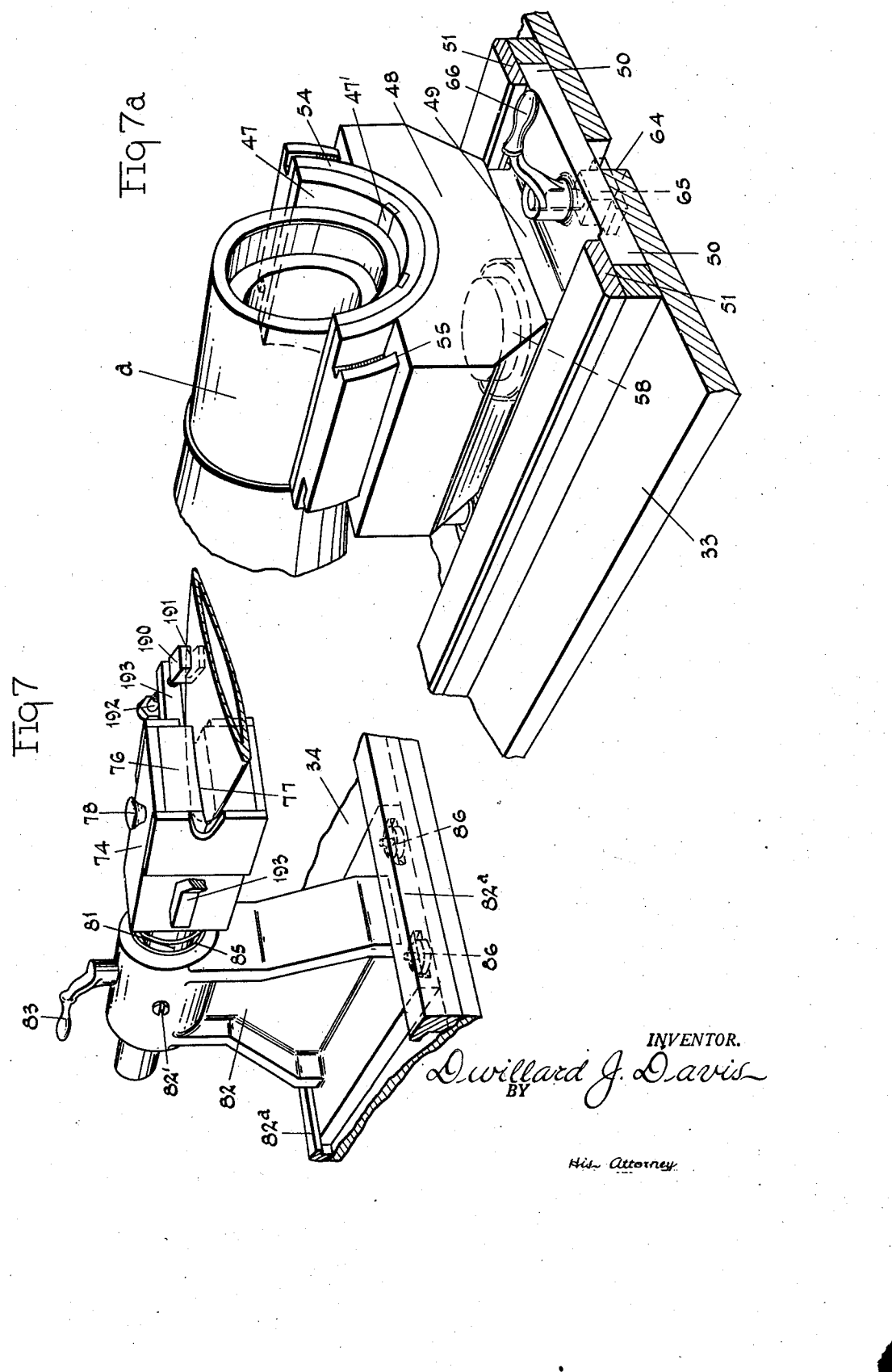

Nov. 9, 1948.  D. J. DAVIS  2,453,306
APPARATUS FOR MEASURING WALL THICKNESS
OF PROPELLER BLADES
Filed May 24, 1945  10 Sheets-Sheet 4

INVENTOR.
Dwillard J. Davis
BY Fred Gerlach
His Attorney.

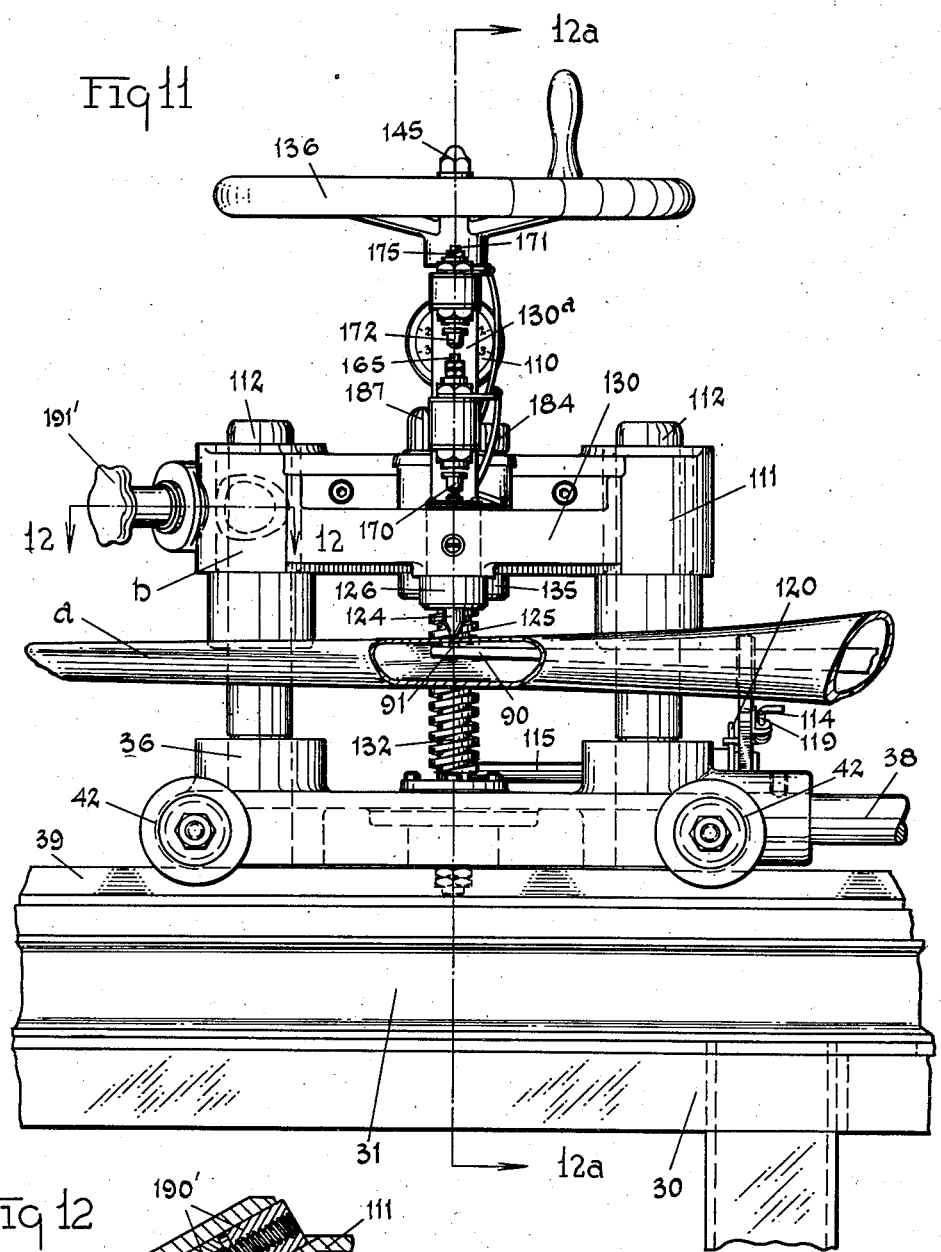

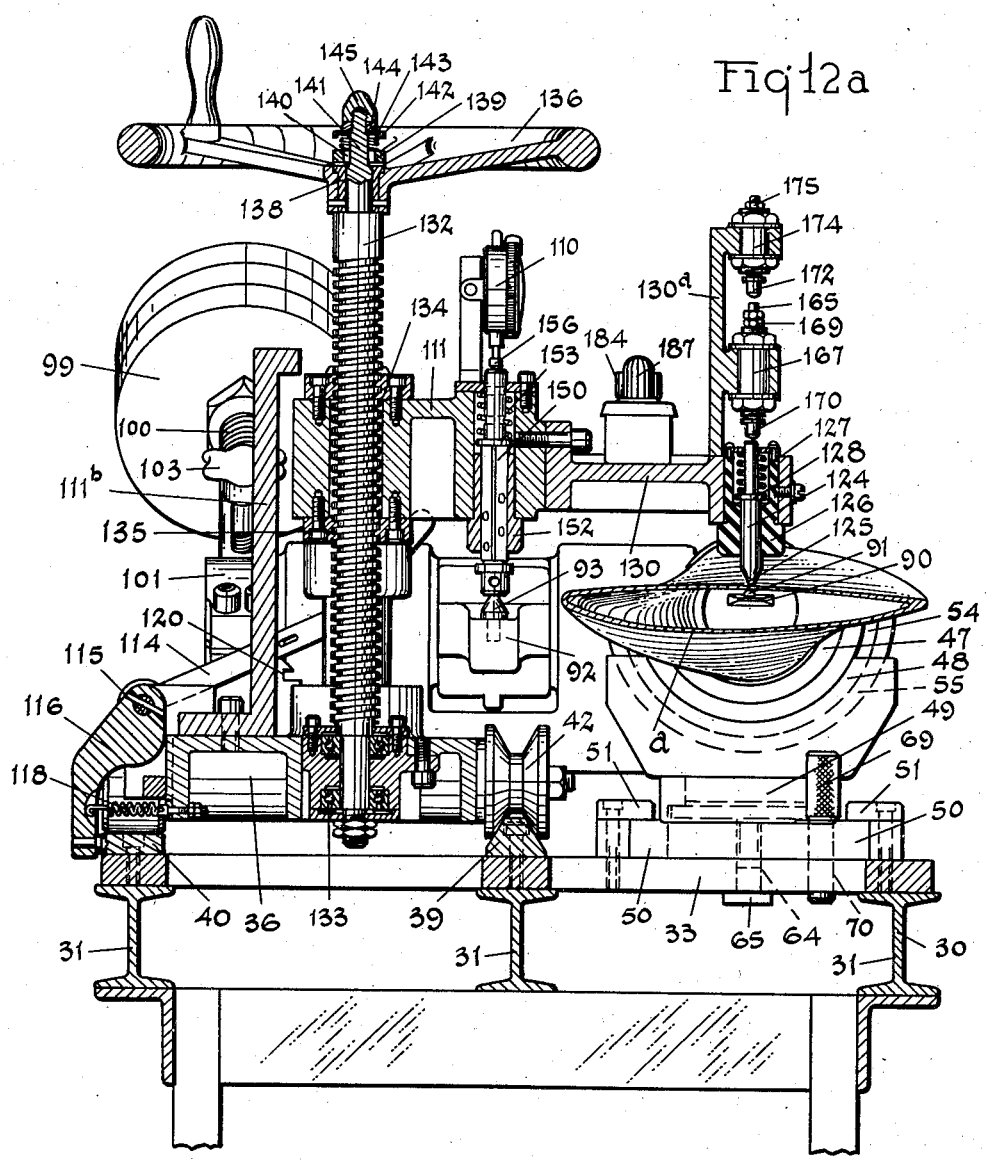

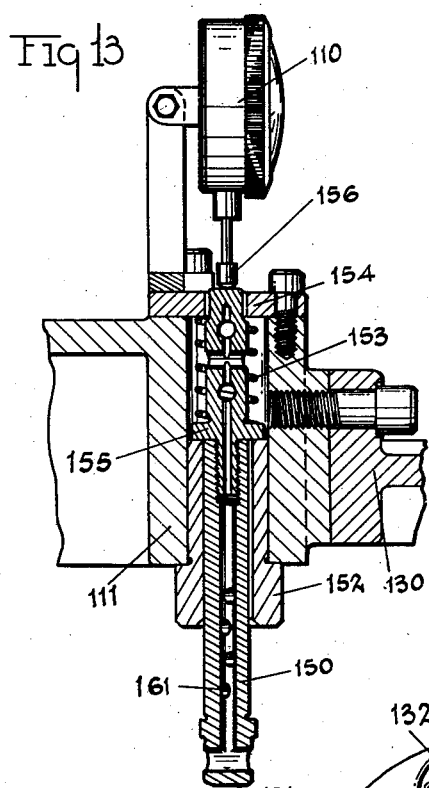
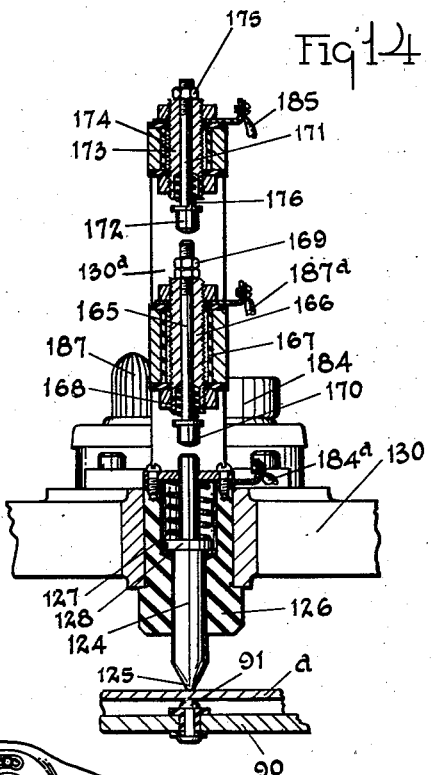
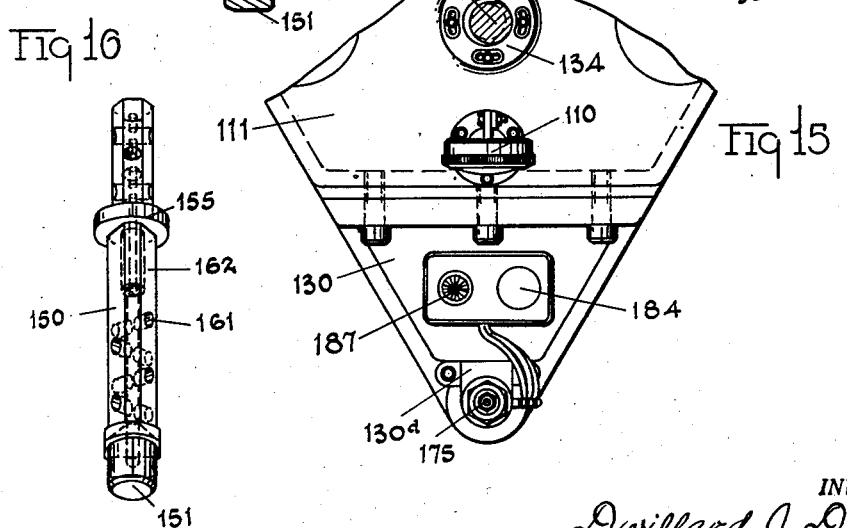

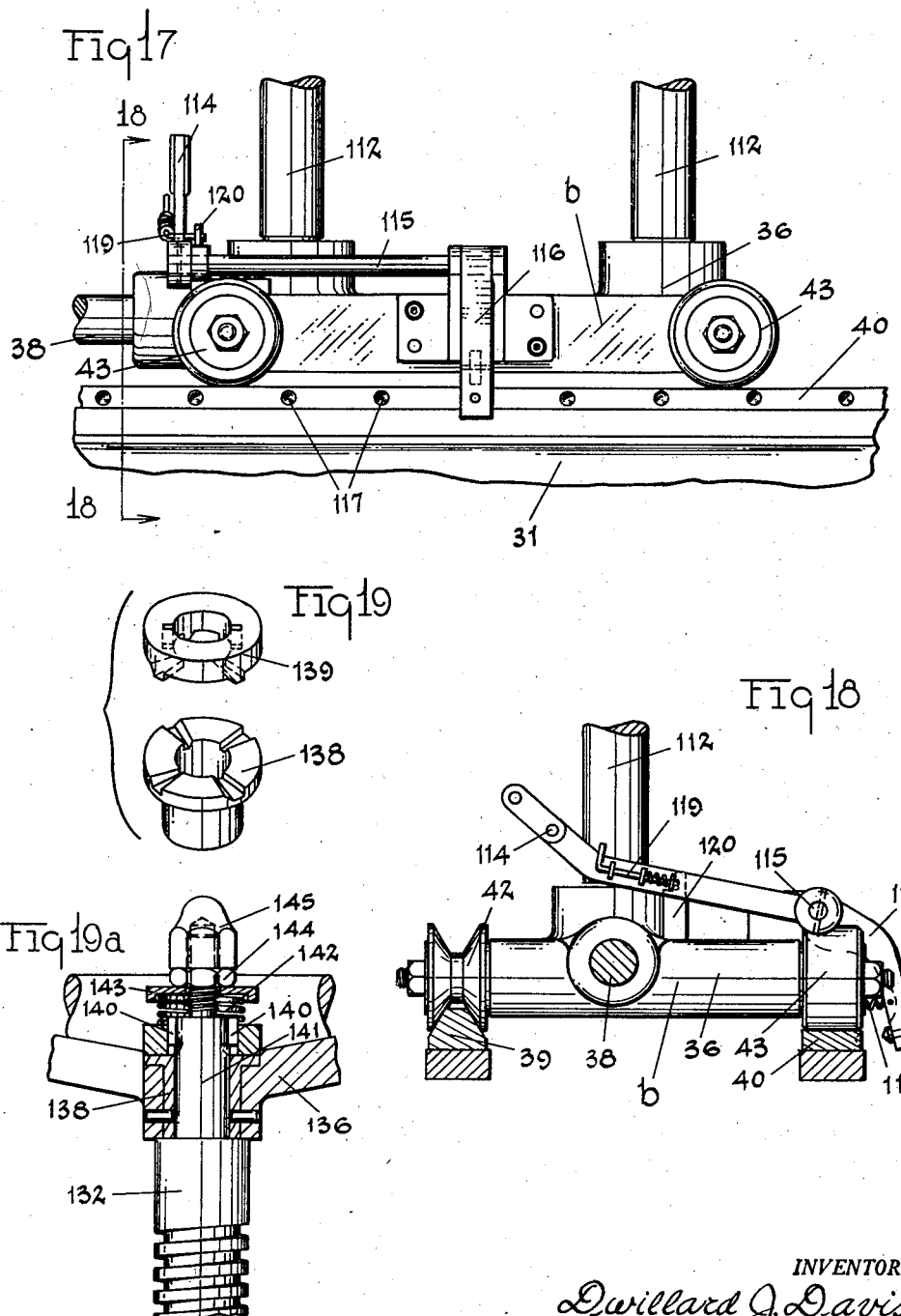

Nov. 9, 1948.   D. J. DAVIS   2,453,306
APPARATUS FOR MEASURING WALL THICKNESS
OF PROPELLER BLADES
Filed May 24, 1945   10 Sheets-Sheet 9
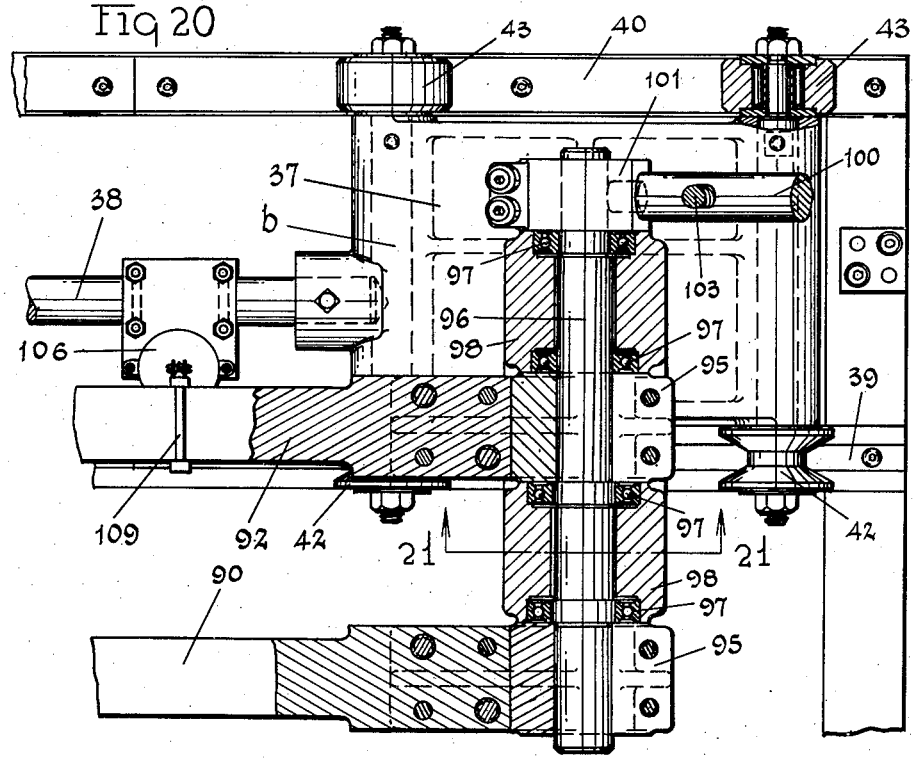
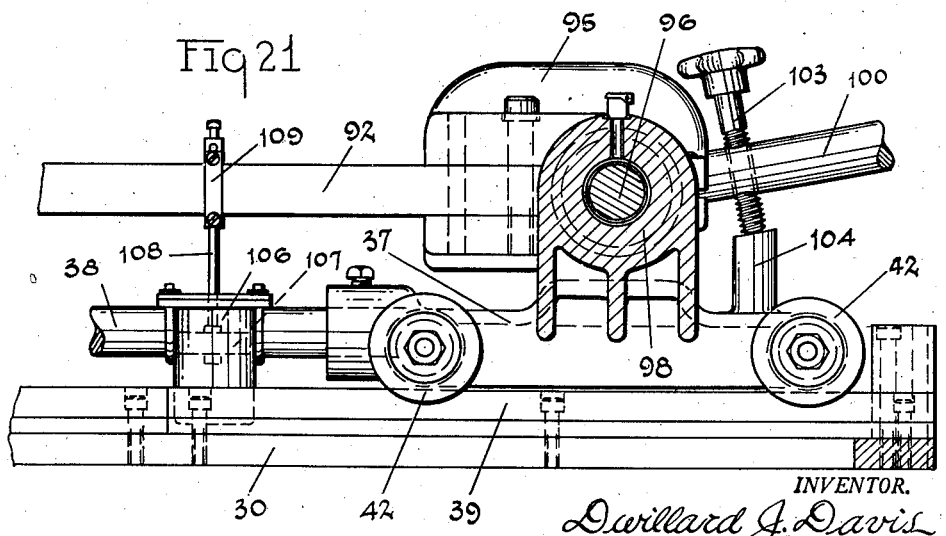
INVENTOR.
D Willard J. Davis
BY
Fred Gerlach
his Attorney

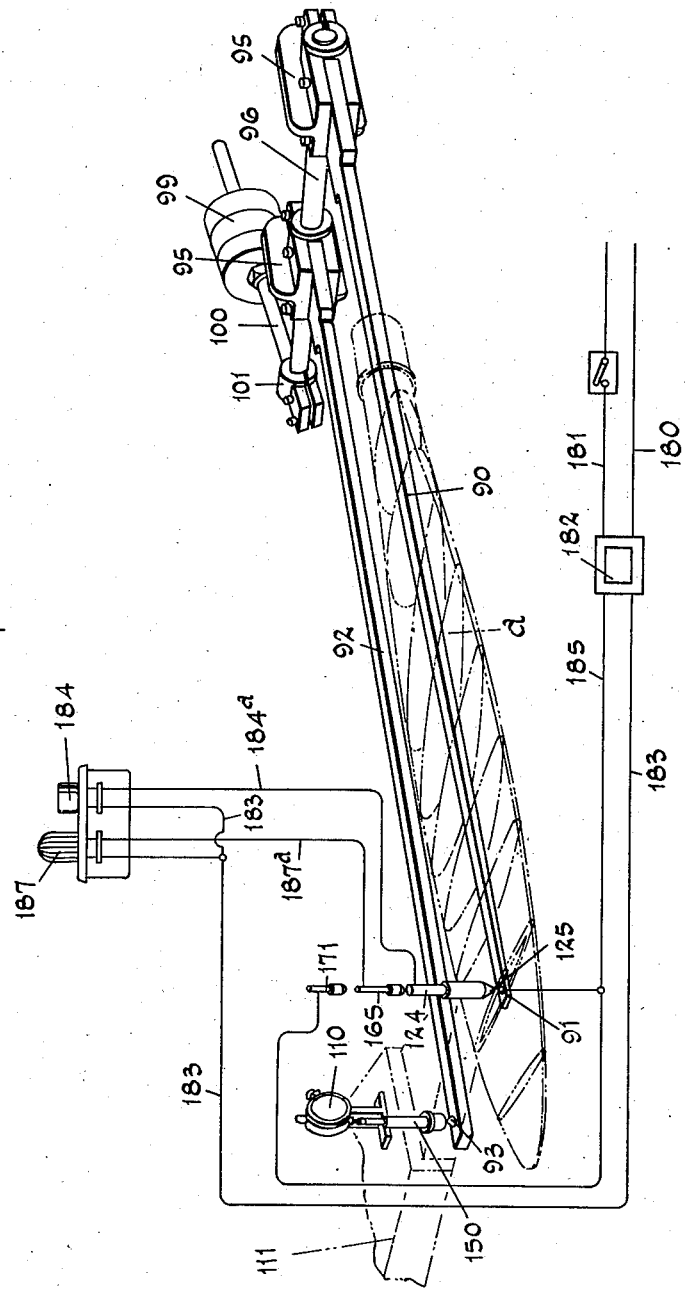

Patented Nov. 9, 1948

2,453,306

UNITED STATES PATENT OFFICE 2,453,306

APPARATUS FOR MEASURING WALL THICKNESS OF PROPELLER BLADES

Dwillard J. Davis, Detroit, Mich., assignor to Avco Manufacturing Corporation, a corporation of Delaware Application May 24, 1945, Serial No. 595,584

27 Claims. (Cl. 33—148)

The invention relates to apparatus for measuring the wall-thickness of hollow propeller blades.

The main object of the invention is to provide improved apparatus for expeditiously and accurately measuring the wall-thickness of propeller blades.

Another object of the invention is to provide apparatus whereby the thickness can be measured of substantially all portions of hollow propeller blades which are provided with longitudinally curved or helical leading and trailing edges, or blades having faces of different contours.

Another object of the invention is to provide improved apparatus for measuring the wall-thickness of hollow propeller blades in which the measuring mechanism is mounted on a carriage to travel longitudinally of the blade which includes adjustable supports for the ends of the blade which are adapted for blades of different lengths or widths and which are adjustable transversely of the blade and angularly for measuring the blade at points along different longitudinal lines and along the leading and trailing edges.

Another object of the invention is to provide measuring apparatus for measuring the wall-thickness of propeller blades which is mounted on a carriage which is movable longitudinally of the blade and comprises counterweighted beams mounted on the carriage for controlling the operation of a gauge mounted on the carriage.

Another object of the invention is to provide apparatus which is adapted to accurately measure the wall-thickness of hollow propeller blades.

Another object of the invention is to provide measuring apparatus for the wall-thickness of hollow propeller blades, which includes contacts engageable with the wall and gauge operating mechanism which is inoperative to apply excessive pressure at the contacts.

Other objects will appear from the detailed description.

The invention consists in the several novel features hereinafter set forth and more particularly defined by claims at the conclusion hereof.

In the drawings:

Fig. 1 is a front elevation of apparatus embodying the invention.

Fig. 2 is an end elevation of the apparatus viewed from the right end.

Fig. 3 is an end elevation viewed from the opposite end.

Fig. 4 is a plan, parts being broken away.

Fig. 5 is a longitudinal section of the device for supporting the tip of the blade on the table.

Fig. 6 is an end view of the device for supporting the tip of the blade shown in Fig. 5, the table being shown in section.

Fig. 7 is a perspective of the device for holding the tip of the blade.

Fig. 7a is a perspective of the holder for the shank of the blade.

Fig. 11 is a front elevation of a portion of the carriage, the carrier for the gauge and the devices on the carrier.

Fig. 12 is a section taken on line 12—12 of Fig. 11.

Fig. 12a is a transverse section taken on line 12a—12a of Fig. 11.

Fig. 13 is a vertical section illustrating the gauge and stem which operates the gauge.

Fig. 14 is a vertical section illustrating the contact engaging on the outer surface of the blade and the parts associated therewith.

Fig. 15 is a plan of a portion of the gauge carrier.

Fig. 16 is a perspective of the stem which operates the gauge.

Fig. 17 is a rear side elevation of a section of the longitudinally movable carriage and the device for locking the carriage against longitudinal movement and in spotted positions.

Fig. 18 is a section taken on line 18—18 in Fig. 17.

Fig. 19 is a perspective of the disassembled parts of the slip-connection between the hand-wheel and the screw for raising and lowering the gauge carrier.

Fig. 19a is a section illustrating said slip-connection in mechanism for raising and lowering the carrier which supports the gauge and the contact for engaging the outer face of the blade.

Fig. 20 is a plan view, partly in section, of the contact-carrying beams and the section of the longitudinally movable carriage on which they are pivotally sustained.

Fig. 21 is a section taken on line 21—21 of Fig. 20.

Fig. 22 is a diagrammatic perspective of the blade contacts for measuring the wall-thickness, the gauge and the signalling devices for indicating engagements of the contacts which engage the blade and the completion of a measuring operation.

The invention is exemplified in an apparatus which comprises generally: a supporting bed or table; devices on the table for supporting, respectively, the tip and shank-ends of the hollow propeller blade to be measured; a carriage on which the measuring mechanism is supported and which is mounted on the table for rectilinear movement longitudinally of the blade; a pivoted beam-carried contact or feeler for engaging the inner surface of the blade and movable into the blade; a second contact-carrying beam mounted on the carriage outside of the blade and carrying a contact for operating the gauge; a carrier with a gauge mounted thereon for vertical movement on the longitudinally movable carriage and operable by a contact on the second beam; a contact or feeler movable longitudinally with the gauge-carrier and movable vertically thereon for engaging the outer surface of the blade in vertical alignment with the contact on the inner beam; a gauge-operating element vertically movable in the gauge carrier adapted to be engaged by the stop on the outer beam; mechanism for lowering the carrier to measure the wall-thickness of the blade between the contacts engaging the inner and outer surfaces of the blade; counter-balancing means applied to the beams for holding the contacts thereon in engagement with the inner surface of the blade and for operation of the gauge, with a predetermined pressure; and devices for indicating when the blade-engaging contacts are engaged with the blade.

The supporting structure for the apparatus comprises: a frame 30 built up of structural parts including on its top three longitudinal I-beams 31; a bed or table-section 33 on which the device for supporting the shank-end of the blade is mounted; and a table or bed-section 34 on which the device for positioning and supporting the tip-end of the blade is mounted.

Figure 8:
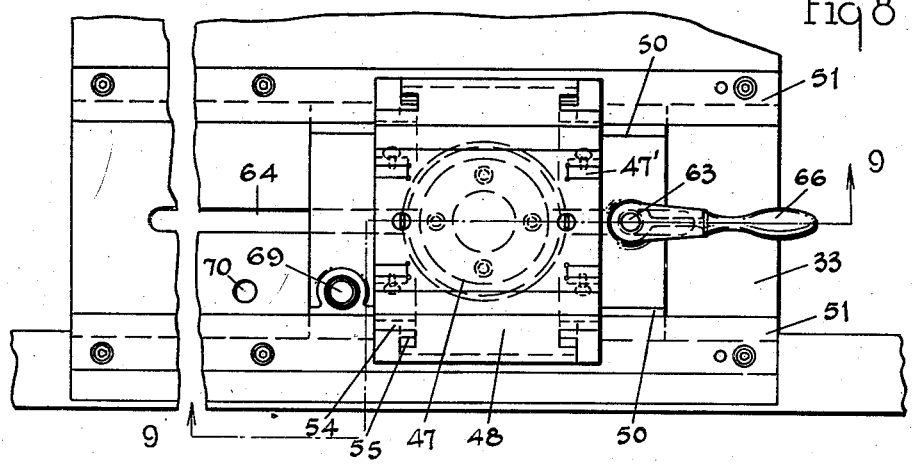
Fig. 8 is a plan view of the device for supporting the shank of the blade.
Figure 9:
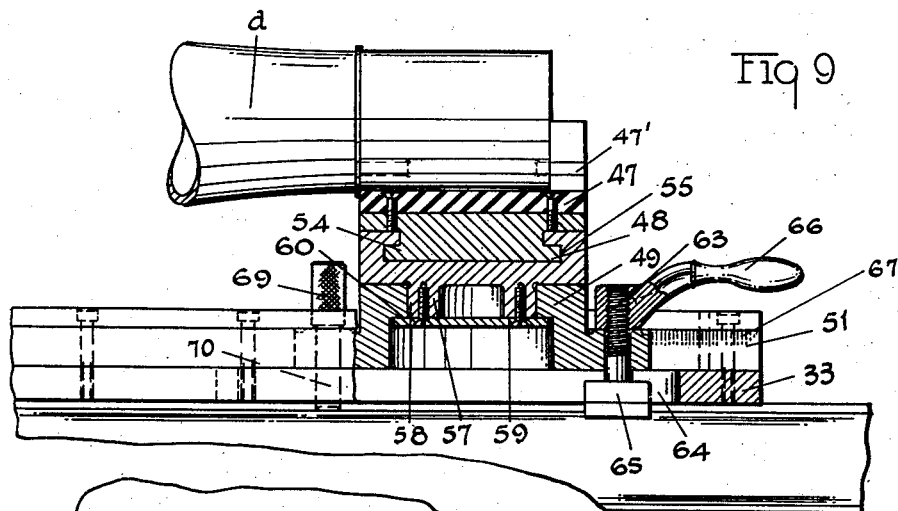
Fig. 9 is a section taken on line 9—9 of Fig. 8.
Figure 10:
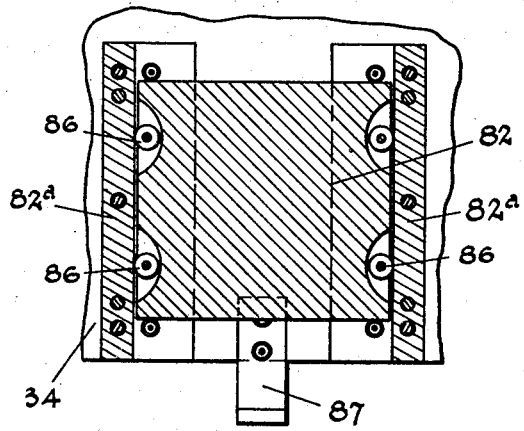
Fig. 10 is a section taken on line 10—10 of Fig. 5.

The propeller blade $a$ is supported with its longitudinal axis extending longitudinally of the table by a device which is adapted to receive the shank of the blade and a device for supporting the tip-end of the blade. The device for supporting the shank-end of the blade comprises: a semi-cylindrical chuck-member 47 (Fig. 7a) which is mounted in a block 48 and a base or bracket 49 on which the block 48 is supported and which is provided with side-members 50 which are slidably guided in stationary guides 51 on the table-section 33, for adjustment of this supporting device longitudinally of the table. Chuck member 47 has fixed thereto a semi-cylindrical member 54 which fits in an arcuate channel 55 in block 48. Block 48 is provided with a vertical trunnion 58 which fits in a bearing in base 49 and permits block 48 to rotate horizontally on said base. A plate 59 is secured to the lower end of stud 57 and engages an annular shoulder 60 in bracket 49 for retaining block 48 on base 49. A stud 63 extends vertically through the base 49 at one end thereof and through an elongated slot 64 in the table-section 33, is provided with a head 65 at its lower end for engaging table-section 33 and a screw-handle 66 whereby the stud may be tightened to clamp the base 49 in its adjusted position longitudinally of the table. Calibrated lines 67 (Fig. 9) are provided on one of the guides 51 to indicate the longitudinal position of the bracket 49 and member 47 on the table. A pin 69 extends vertically through a hole in the bracket 49 and is adapted to enter any of a series of holes 70 in table-section 33 to longitudinally spot the chuck-member 47 for the blades of different standard lengths. Wear plates 47' are provided in the upper face of member 47 on which the shank of the blade is adapted to rest. This construction exemplifies a device which is adjustable longitudinally of the blade for supporting blades of different length, and in which the chuck-member is horizontally rotatable to permit the shank end of the blade to be shifted angularly in a horizontal plane relatively to the measuring mechanism for measuring points along the edges of the blade.

The device for supporting the tip-end of the blade over the table comprises a socket 74 (Figs. 5 and 6) in which is confined a block 76 which is divided on its horizontal center. Block 76 is preferably of fibre and the contiguous faces of its sections are notched to form a transverse groove 77 with an inwardly curved end, which is adapted to receive and fit around the curved tip of the blade. The sections of block 76 are held to permit a slight angular movement in socket 74 by a pin 78 which extends vertically through socket 74 and the sections of the block 76. Shoes 190 provided with grooves 191 in which the tip of the blade fit are secured to stems 192 which are threaded to lugs 193 which are fixed to socket 74. Socket 74 is supported for movement longitudinally of the blade on and for rotation around a cylindrical-stem 79 on a shaft 81. The outer end of stem 79 is provided with a washer 80 for limiting the sliding movement of socket 74 on stem 79. Shaft 81 with its stem 79 is slidably adjustable longitudinally of the blade in a bracket 82 in which said shaft may be locked in different positions by a clamp-screw 83 which is adapted to enter recesses 84 along the shaft 81. Screws 82' in bracket 82 extend into grooves in shaft 81 to hold said shaft against rotation. A spring 85 is interposed between socket 74 and shaft 81 to press the block 76 into snugly fitting relation with the tip of the stem and to permit the block to be disengaged from the tip of the blade. Bracket 82 is mounted for sliding adjustment transversely of the table in guides 82a. Bracket 82 is provided with rollers 86 for engaging the inner faces of guides 82a which are fixedly secured to the table-section 34. A stop 87 is secured to table-section 34 for limiting outward movement of bracket 82. Socket 74 is rotatable on stem-portion 79 of shaft 81 to permit the groove in block 76 to be rotated on its axis to conform to the helical angle on the tip-end of the blade. This exemplifies a transversely adjustable device for supporting and positioning the tip-end of the blade for different angular positions relatively to the measuring device hereinafter described.

The mechanism for measuring the wall-thickness of the blade is supported on a carriage generally designated $b$, which is movable longitudinally of the table and the blade. This carriage $b$ comprises: a section or frame 36 on which the gauge and associated parts are supported; a section or frame 37 on which are supported the tilting beams hereinafter described which respectively carry a contact or feeler for engaging the inner surface of the blade and a stop for controlling the gauge or mechanical dial indicator and a rod 38 which extends between the sections 36 and 37 connects them for conjoint travel longitudinally of the table. The carriage is adapted to travel on a V-shaped rail 39 which is fixedly supported on the longitudinal center of the table and a flat rail 40 secured on rear side of the table. Each of the sections 36, 37 is provided with a pair of V-rollers 42 adapted to run on rail 39 and with a pair of rollers 43 adapted to run on rail 40.

The measuring mechanism for the wall-thickness of the hollow blade a mounted on the carriage b comprises: a beam 90 which is adapted to extend through the bore of the shank of the blade into the hollow blade a and is provided with a contact or feeler 91 adapted to engage the inner face of the wall to be measured in thickness, and a beam 92 which extends outwardly of the blade and carries at its distal end a stop 93 which is adapted to be engaged by the gauge-operating means hereinafter described. Beams 90 and 92 extend longitudinally of the path of travel of the carriage b. Beams 90 and 92 (Figs. 20 and 21) are each secured to members 95 and both of said members are clamped to a cross-shaft 96 which is journalled in anti-friction bearings 97 in pedestals 98 which are integrally formed with a carriage-section 37. Counterweights 99 are adjustably mounted on a rod 100 which is fixed to a clamp 101 which is secured on shaft 96. The weights 99 are longitudinally adjustable on rod 100 and clamp 101 is adjustable on shaft 96 to vary the predetermined pressure to be applied to beams 90 and 92 so that the beam 90 will cause its contact 91 to exert a limited degree of pressure, say, six to eight ounces, against the inner face of the blade during the measuring operation. A stop-screw 103 is screw-threaded to rod 100 and is adapted to engage a stop 104 on carriage section 37 for normally positioning beams 90 and 92. The portion of beam 90 which is adapted to enter the hollow propeller blade is preferably tapered toward its contact 91 so that it can engage the inner face of the blade in the narrow portions of the space in the blade adjacent the leading and trailing edges and at the tip. A dash-pot comprises a cylinder 106 mounted on the rod 38 of the longitudinally movable carriage b and a piston 107 in said cylinder which is provided with a stem 108 which is secured by a clamp 109 to beam 92, and this dash-pot cushions the pivotal movements of beams 90, 92. This exemplifies a pair of counter-weighted beams pivotally mounted on the carriage b, and secured together for conjoint tilting, one of which is adapted to extend into the blade and carries a contact or feeler for engaging the inner surface of the blade and an outer beam which carries a stop controlled by the contact on the inner beam for engagement by the gauge-operating means. The longitudinally movable carriage b may be locked in spotted positions longitudinally of the table or propeller blade by a device which comprises (Figs. 12, 17 and 18), a lever 114 on a shaft 115 which is fulcrumed on carriage-section 36, and arm 116 on said shaft, and provided with a conical-ended stud adapted to enter sockets 117 in the rear of rail 40, a spring 118 applied to arm 116 for folding the stud normally engaged with rail 40, and a spring-pressed bolt 119 carried by lever 114 is adapted to engage a latch 120 on carriage-section 36 for locking lever 114 in its carriage-releasing position.

A gauge such as a mechanical dial indicator 110 which is calibrated to indicate measurements of wall-thickness is mounted on a carrier 111 which is slidably mounted on upstanding posts 112, the lower ends of which are fixedly secured in the carriage-section 36. A stem 124 is carried in a sleeve 126 of insulated material, and is provided with a contact or feeler 125 for engaging the outer surface of the propeller blade in substantial axial alignment with contact or feeler 91 on the beam 90. A spring 127 in sleeve 126 engages an annular shoulder 128 on stem 124 and holds the contact 125 normally in a predetermined position vertically with respect to the carrier 111. Sleeve 126 is fixedly secured in a section 130 which is secured to, and vertically movable with the carrier 111 so that the contact 125 will be movable vertically with gauge 110 and carrier 111. Contact 125 and stem 124 are adapted to position carrier 111 and the gauge 110 carried thereby according to the thickness of the blade between contacts 91 and 125.

The means for operating the gauge 110 comprises: a stem 150 which is provided at its lower end with a contact 151 adapted to engage the stop 93 on the beam 92 and is slidably mounted in a sleeve 152 which is fixedly held in carrier 111; a spring 153 between a cap-plate 154 and a shoulder 155 on stem 150 for yieldingly holding contact 151 in a predetermined vertical position in carrier 111 and which permits stem 150 to be shifted by stop 93 on beam 92 to operate the gauge 110 which is provided with a spring-pressed depending-stem 156 which engages the upper end of stem 150. The vertical movement of contact 151 and stem 150 relatively to the contact 125 causes the gauge 110 to be actuated by stem 150 correspondingly to the wall-thickness of the blade a between contacts 91 and 125. Stem 150 is formed of two sections screw-threaded together and is provided with holes 161 and flat surfaces 162 on its outer periphery to reduce weight and friction between the stem 150 and sleeve 152. Carrier 111, gauge 110, contact 125, and the gauge-operating means are movable vertically to move the contact 125 into and out of engagement with the outer face of the propeller blade by mechanism (Fig. 12a) which comprises: a screw-shaft 132, the lower end of which is journalled in anti-friction bearings 133 in carriage-section 36. Shaft 132 has a screw-threaded connection with collars 134 and 135 which are secured to carrier 111 so that rotation of said shaft will raise or lower the carrier 111. Shaft 132 is rotatable by a hand-wheel 136 which is rotatably mounted on and connected to the upper end of shaft 132 for rotation of the shaft by a slip-connection which causes rotation of said shaft by the hand-wheel to be discontinued when the contact 125 engages the outer surface of the blade to prevent such engagement with excessive pressure or marring of the blade by said contact. This slip-connection comprises (Figs. 19, 19a) : a collar 138 which is secured to rotate with the hub of hand-wheel 136 and provided on its upper face with clutch-teeth having one of their sides inclined; a collar 139 slidably connected by splines 140 to the stem 141 on the upper end of shaft 132 and provided on its under face with clutch-teeth having co-acting inclined sides and interfitting with the clutch-teeth on collar 138; a spring 142 for yieldingly pressing clutch collars 139 and 138 into interfitting relation, and permitting them to slip in one rotative direction; a flanged ring 143 engaged by the upper end of spring 142; a nut 144 for positioning ring 143 on stem 141; and a locking-nut 145 for nut 144. This slip-connection can be adjusted by the adjustment of the spring 142 so that when contact 125 is lowered into engagement with the outer surface of the propeller blade the vertical movement of carrier 111 will be arrested and continued rotation of the hand-wheel 136 will not increase the pressure of contact 125 against the outer surface of the propeller blade. A stop 111b is fixed to carriage-section 36 (Fig. 12a) for limiting the upward movement of carrier 111 beyond a predetermined limit. A sleeve 190′ composed of sections and a screw 191' (Fig. 12) are adapted to clamp the carrier 111 to one of the posts 112 when it is desired to lock said carrier against vertical movement.

The invention provides means (Fig. 22) for indicating to the operator the conditions of the mechanism during checking operations and more particularly to determine whether contacts 91 and 125 are engaged with the inner and outer surfaces of the blade, respectively. For this purpose, a stem 165 (Figs. 12ª and 14) is slidably mounted in a sleeve 166 which is insulated as at 167 from the carrier section 130 and said stem is normally pressed downwardly by a spring 168 to engage an adjustable stop 169 on its upper end and sleeve 166. Stem 165 is provided at its lower end with a contact 170 which is engageable by the stem 124. A stem 171, provided at its lower end with a contact 172 engageable by the upper end of stem 165, is slidably mounted in a sleeve 173 which is insulated at 174 from the bracket 130ª on the carrier-section 130 and is normally pressed downwardly by a spring 176 to be arrested by a nut 175. The stems 124, 165 and 171 are electrically connected to a circuit as illustrated in Fig. 22. Lamps 184 and 187 are actuated from a power circuit including conductors 180, 181 and transformer 182. Lamp 184 is connected by a conductor 184ª to stem 124 and by conductor 183 to the transformer 182 which is connected by conductor 185 to contact 91 for a circuit through the blade. Lamp 187 is connected by a conductor 187ª to stem 165 and by conductor 183 which is connected to the transformer 182 and is actuated when stem 165 engages stem 124 from which current passes through the blade to contact 91 and conductor 185 which is connected to the transformer 182. When contact 91 does not engage the blade, lamps 184 and 187 may both be actuated when sufficient downward movement or pressure is applied to the carrier 111 to engage stems 124, 165 and 171. Current will then flow through conductor 183, lamp 184, conductor 184ª, to stem 125 and through lamp 187 from conductor 183 through conductor 187ª to stem 165 and from stems 124 and 165 to stem 171 and thence through conductor 185 to the transformer 182.

The operation of the apparatus is as follows: The propeller blade a to be measured is placed with its tip-end in the groove 77 of block 76 and its shank-end is laid in the chuck-member 47. In this placement of the blade, the spring 85 will permit socket 74 to move longitudinally until the shank-end is located in the chuck-member and will yieldingly hold block 76 in engagement with the tip of the blade. The devices for supporting the shank and tip, respectively, may be adjusted longitudinally of the table to receive and hold blades of different lengths. The stem or shaft 81 which carries socket 74 and block 76 may be shifted longitudinally in bracket 82 and locked therein by tightening the screw-handle 83 in the notches 84. The shank supporting chuck-member 47 may be adjusted longitudinally of the blade, upon loosening screw-handle 66 on screw 63 and removing pin 69, to the desired position for supporting the blade. Upon tightening handle 66 the chuck-member 47 will be secured against longitudinal movement. The measuring mechanism on the carriage b is movable longitudinally of the blade for longitudinal movement and measuring wall-thickness at different points in a longitudinal line of the blade while the tip and shank-supporting devices are left in their longitudinally adjusted positions.

In order to position the blade with its longitudinal axis angularly to the movement of the carriage 36 for locating the contact 91 for measuring the wall-thickness at points between the longitudinal center of the blade and its edges, the tip-supporting device is adjusted transversely which will cause the blade and its shank-holder to swing horizontally on the axis of the trunnion 57 for the block 48 which supports the chuck-member 54. By moving the carriage 36 for the measuring mechanism longitudinally and the angular setting of the blade, the contact 91 may be positioned to measure the wall-thickness in any portion of the blade faces.

In order to measure the wall-thickness at points in some spots of hollow blades which usually have longitudinally curved leading and trailing edges, it is necessary to shift the blade-supporting devices so the beam 90 can extend into the hollow blade in a horizontally angular direction relatively to the longitudinal axis of the blade. This may be done by relative transverse adjustment of the tip-supporting device and pivotal movement of the shank-supporting device. The trunnion 57 on guide-block 48 permits horizontal angular movement of chuck-member 47 for this purpose, and the pivot pin 78 permits the block 76 to move angularly. By means of these adjustments of the tip-supporting and shank-supporting devices, blade a may be shifted relatively to position contact 91 on beam 90 to measure the wall-thickness in substantially all portions of the blade faces. Socket 74 which carries the tip-holding block 76 is rotatable on stem 79, and the shank is rotatable on the chuck-member 47 to permit rotation of the blade on its longitudinal axis for positioning contact 91 so that it will engage the inner face of transversely curved face positions of the blade on axes substantially perpendicular to said surfaces. In setting the measuring mechanism, the gauge 110 is adjusted to register zero when the contact or feeler 91 engages the contact 125. When the mechanism is once adjusted in this manner, the measuring operations will result in indicating the wall-thickness on the gauge 110. At the commencement of the measuring operations for a blade, the carriage b is moved to the right hand end of the table with the beam 90 outside of the blade where it will pass through the opening in the shank of the blade. The carriage b is then moved left to bring the contact 91 on beam 90 to the point to be measured. The gauge-carrier 111 is normally maintained in its raised position. When contacts 91 and 125 have been moved longitudinally to a spot to be measured, the operator will rotate hand-wheel 136 to operate screw-shaft 32 and lower the carrier 111.

When the carrier 111 is lowered for a measuring operation, contact 125 will engage the outer surface of the blade. A circuit will then be established through conductor 183, lamp 184, conductor 184ª, stem 124 and contact 125, the blade, contact 91 and conductor 185. Lamp 184 will then be energized. If carrier 111 is urged downwardly with continued pressure against the blade so as to overcome the zero setting of dial indicator 110, the stem 124 is forced upwardly and engages contact 170 on stem 165 to close a circuit through conductor 183, lamp 187, conductor 187ª, stems 165, 124, contact 125, the blade, contact 91 and conductor 185. Lamp 187, which is usually of a different color for differentiation from lamp 184, will provide a warning signal of this excess pressure. Adjustment of the carrier 111 slightly upward will open the circuit for lamp 187 between stem 124 and contact 170 and indicate that the excess pressure has been removed. Since engagement of contact 91 with the inner surface of the blade cannot be otherwise determined, provision is made for simultaneously energizing both lamps 184 and 187. If there is no engagement of contact 91 and the blade, the circuits for lamps 184, 187 will be open. Continued downward movement of carrier 111 will increase the pressure of stem 124 and its contact against the blade and force stem 124 upwardly and shift stem 165 to engage contact 172 on stem 171. Both lamps 184, 187 will then be energized without engagement of contact 91 and the inner face of the blade. The circuit for lamp 187 will be through conductor 183, lamp 187, conductor 187a, stems 165, 171, and conductor 185. The circuit for lamp 184 will be through conductor 183, lamp 184, conductor 184a, stems 124, 165, 171, and conductor 185. The simultaneous operation of both lamps 184, 187 will indicate the failure of contact 91 to engage the inner face of the blade. Lamp 184 indicates ordinary reading conditions and lamp 187 slight overpressure. The operator can distinguish the variance and adjust the measuring mechanism so that the circuit for lamp 184 closes when contacts 91 and 125 engage the inner and outer faces of the blade. If, however, contact 91 does not engage the blade, the continued lowering of the carrier 111 will increase the pressure on stem 124 and close the circuits for both lamps 184, 187 through stem 171 as an indication of the lack of engagement of contact 91 and the inner face of the blade, or if such pressure is applied, the lamps will not be actuated. In practice, the normal clearance between stems 124 and 165 may be .002 inch and that between stems 165 and 171 may be .015 inch. If objectionably excessive downward pressure is applied to the carrier 111, the slip-connection between shaft 132 and hand-wheel 136 will prevent further lowering movement of the carrier 111 by the hand-wheel 136. The wall-thickness at substantially all points of both faces of the blade may be successively measured by setting of the carriage and relative setting of the blade-supporting devices. By longitudinal movements of the carriage and the setting of the blade-supporting devices into different transverse and angular positions relatively to beam 90, the contact 91 may be positioned to engage and measure points near the curved leading and trailing edges of the plate and in the tip. After the wall-thickness of one of the faces has been measured, the blade can be rotated for measuring the other face. A transverse series of points may be successively measured while the carriage b remains locked at each longitudinal station by transverse adjustment of the supporting device of the blade. A longitudinal series of spots may be successively measured by moving the carriage b longitudinally relatively to the blade. During these measuring operations, the counter-weights 99 will at all times urge the contact 91 against the inner face of the blade with a limited pressure. The counter-weights 99 may be adjusted to cause contact 91 to exert an upward force of from three to ten ounces. The narrow spaces between the blade-faces adjacent the tip of the propeller blade necessitates the use of a beam 90 which lacks sufficient inherent rigidity for avoiding deflection stresses. The low degree of pressure exerted by the contact 91 against the blade results in substantially uniform deflection in the beam at all times. The load imposed upon the beam 92 by the spring 153 will be substantially uniform. As a result, when the measuring mechanism is once correctly adjusted to indicate zero, the inherent deflection of the beams will remain uniform and the measurement of the wall-thickness will be truly indicated on the gauge.

The invention exemplifies apparatus for measuring the wall-thickness of hollow steel propeller blades which can be expeditiously operated and which will accurately measure the wall-thickness. The invention also exemplifies an apparatus which provides for relative movement of the measuring mechanism and the blades, for measuring the wall-thickness of blades of different shapes and lengths.

The invention is not to be understood as restricted to the details set forth, since these may be modified within the scope of the appended claims without departing from the spirit and scope of the invention.

Having thus described the invention, what I claim as new and desire to secure by Letters Patent is:

1. Measuring apparatus for the wall-thickness of hollow propeller blades comprising: devices for supporting the tip and shank of the blade; a carriage mounted for movement longitudinally of the blade; mechanism for measuring the wall-thickness mounted on and movable longitudinally with the carriage, including a beam adapted to extend into the blade and carrying a contact for engaging the inner face of the blade-wall; and means for adjusting the supporting devices to support the blade relatively to the contact on the beam for engagement of said contact with substantially any portion of the inner face of the blade-wall.

2. Measuring apparatus for the wall-thickness of hollow propeller blades comprising: devices for supporting the tip and shank of the blade; a carriage mounted for movement longitudinally of the blade; mechanism for measuring the wall-thickness mounted on and movable longitudinally with the carriage, including a beam adapted to extend into the blade and carrying a contact for engaging the inner face of the blade-wall; and means for individually adjusting the supporting devices to support the blade relatively to the contact on the beam for engagement of the contact with substantially any portion of the inner face of the blade-wall.

3. Measuring apparatus for the wall-thickness of hollow propeller blades comprising: devices for supporting the tip and shank of the blade; a carriage mounted for movement longitudinally of the blade; mechanism for measuring the wall-thickness mounted on and movable longitudinally with the carriage, including a beam adapted to extend into the blade and carrying a contact for engaging the inner face of the blade-wall; and means for adjusting the supporting devices to support the blade relatively to the contact on the beam for engagement of the contact with substantially any portion of the inner face of the blade-wall, one of said devices being provided with spring-means for urging the blade toward the other device.

4. Measuring apparatus for the wall-thickness of hollow propeller blades comprising: means for supporting the blade; a carriage mounted for movement longitudinally of the blade; and mechanism for measuring the wall-thickness mounted on and movable longitudinally with the carriage and including a pivoted beam adapted to extend into the blade and carrying a contact for engaging the inner face of the blade-wall, a second beam pivotally movable with said other beam adapted to extend outside of the blade and carrying a stop co-related to the contact on said other beam; and a counterweight for pivoting the inner beam to engage its contact with the inner face of the blade.

5. Measuring apparatus for the wall-thickness of hollow propeller blades comprising: means for supporting the blade; a carriage mounted for movement longitudinally of the blade; mechanism for measuring the wall-thickness mounted on and movable longitudinally with the carriage and including a pivoted beam adapted to extend into the blade and carrying a contact for engaging the inner face of the blade-wall, a second beam pivotally movable with said other beam adapted to extend outside of the blade and carrying a stop co-related to the contact on said other beam; a counterweight for pivoting the inner beam to engage its contact with the inner face of the blade; and means for adjusting the counterweight to vary the pressure of said contact against the blade.

6. Measuring apparatus for the wall-thickness of hollow propeller blades comprising: means for supporting the blade; a carriage mounted for movement longitudinally of the blade; and mechanism for measuring the wall-thickness mounted on and movable longitudinally with the carriage and including a pivoted counter-weighted beam adapted to extend into the blade and carrying a contact for engaging the inner face of the blade-wall, a second beam pivotally movable with said other beam, adapted to extend outside of the blade and carrying a stop co-related to the contact on the beam which extends into the blade, and a dash-pot between one of the beams and the carriage.

7. Measuring apparatus for the wall-thickness of hollow propeller blades comprising: means for supporting the blade; a carriage mounted for movement longitudinally of the blade; mechanism for measuring the wall-thickness mounted on and movable longitudinally with the carriage, including a pivoted counter-weighted beam adapted to extend into the blade and carrying a contact for engaging the inner face of the blade-wall; a second beam adapted to extend outside of the blade and carrying a stop co-related to the contact on the beam which extends into the blade; a signal device; and means including the said contact for actuating said signal device.

8. Apparatus for measuring the wall-thickness of hollow propeller blades comprising: means for supporting the blade; a carriage mounted for movement longitudinally of the blade; a pivoted beam on the carriage adapted to extend into the blade and provided with a contact for engaging the inner face of the blade-wall; a second beam on the carriage, movable with said other beam, outside of the blade, and provided with a stop; a gauge; gauge-operating means; a contact for engaging the outer face of the blade-wall; and a vertically movable carrier on which the gauge-operating means is operable by said stop and on which the gauge and outer contact are mounted.

9. Apparatus for measuring the wall-thickness of hollow propeller blades comprising: means for supporting the blade; a carriage mounted for movement longitudinally of the blade; a pivoted beam on the carriage adapted to extend into the blade and provided with a contact for engaging the inner face of the blade-wall; a second beam on the carriage, movable with said other beam, outside of the blade, and provided with a stop; a gauge; gauge-operating means; a contact for engaging the outer face of the blade-wall; a vertically movable carrier on which the gauge-operating means is operable by said stop and on which the gauge and outer contact are mounted; and screw-means for raising and lowering the carrier for engaging the contact carried thereby with the blade and shifting the operating-means to operate the gauge.

10. Apparatus for measuring the wall-thickness of hollow propeller blades comprising: means for supporting the blade; a carriage mounted for movement longitudinally of the blade; a pivoted beam on the carriage adapted to extend into the blade and provided with a contact for engaging the inner face of the blade-wall; a second beam on the carriage, movable with said other beam, outside of the blade, and provided with a stop; a gauge; gauge-operating means; a contact for engaging the outer face of the blade-wall; a vertically movable carrier on which the gauge-operating means is operable by said stop and on which the gauge and outer stop are mounted; and means for raising and lowering the carrier for engaging the contact carried thereby with the blade and shifting the operating-means to engage the stop for operating the gauge.

11. Apparatus for measuring the wall-thickness of hollow propeller blades comprising: means for supporting the blade; a carriage mounted for movement longitudinally of the blade; a pivoted beam on the carriage adapted to extend into the blade and provided with a contact for engaging the inner face of the blade-wall; a second beam on the carriage, movable with said other beam, outside of the blade and provided with a stop; a gauge; spring-pressed gauge-operating means; a contact for engaging the outer face of the blade-wall; a vertically movable carrier in which the gauge-operating means is slidable by said stop and on which the gauge and outer contact are mounted; and means for raising and lowering the carrier for engaging the contact carried thereby with the blade and shifting the spring-pressed operating-means to engage the stop for operating the gauge.

12. Apparatus for measuring the wall-thickness of hollow propeller blades comprising: means for supporting the blade; a carriage mounted for movement longitudinally of the blade; a pivoted beam on the carriage adapted to extend into the blade and provided with a contact for engaging the inner face of the blade-wall; a second beam on the carriage, movable with said other beam, outside of the blade and provided with a stop; a vertically movable carrier; a gauge mounted on the carrier for vertical movement therewith; a contact carried by the carrier for engaging the outer face of the blade; a stem carried by and slidable in the carrier and engageable with the stop for operating the gauge; and means for raising and lowering the carrier to engage the contact thereon with the blade and shifting the stem so as to be operated by the stop.

13. Apparatus for measuring the wall-thickness of hollow propeller blades comprising: means for supporting the blade; a carriage mounted for movement longitudinally of the blade; a pivoted beam on the carriage adapted to extend into the blade and provided with a contact for engaging the inner face of the blade-wall; a second beam on the carriage, movable with said other beam, outside of the blade and provided with a stop; a gauge; spring-pressed gauge-operating means; a contact for engaging the outer face of the blade-wall; a vertically movable carrier on which the gauge-operating means is mounted for engagement by said stop and on which the gauge and said outer contact are mounted; and means for raising and lowering the carrier and engaging the contact carried thereby with the blade and shifting the operating-means to engage the stop for operating the gauge.

14. Apparatus for measuring the wall-thickness of hollow propeller blades comprising: means for supporting the blade; a carriage mounted for movement longitudinally of the blade; a pivoted beam on the carriage adapted to extend into the blade and provided with a contact for engaging the inner face of the blade-wall; a second beam on the carriage, movable with said other beam, outside of the blade and provided with a stop; a carrier slidably mounted for vertical movement; a gauge mounted on and movable with the carrier; a contact, mounted on the carrier, for engaging the outer face of the blade; a spring-pressed stem carried by and slidably mounted in the carrier for operating the gauge, by engagement with the stop; and means for raising and lowering the carrier.

15. Measuring apparatus for the wall-thickness of hollow propeller blades comprising: devices for supporting the tip and shank of the blade, respectively; a carriage mounted for movement longitudinally of the blade; mechanism for measuring the wall-thickness mounted on and movable longitudinally with the carriage including a beam adapted to extend into the blade and carrying a contact for engaging the inner face of the blade-wall; and means for adjusting the supporting devices to support the blade relatively to the contact on the beam for engagement of said contact with substantially any portion of the inner face of the blade-wall, the shank-supporting device comprising a chuck-member on which the blade is rotatable on its longitudinal axis, the tip-supporting device comprising a rotatable tip-engaging member.

16. The combination with apparatus mounted on a carriage for movement longitudinally, and measuring the wall-thickness, of hollow propeller blades, comprising: a beam mounted on the carriage for longitudinal movement therewith and adapted to extend into the blade for contacting the inner face of the blade-wall; of means for supporting the blade to extend longitudinally of the travel of the carriage; and means for adjusting the supporting-means transversely of the beam for measuring different portions of the blade-wall.

17. The combination with apparatus mounted on a carriage for movement longitudinally, and measuring the wall-thickness, of hollow propeller blades including a beam mounted on the carriage for longitudinal movement therewith and adapted to extend into the blade for contacting the inner face of the blade-wall; of means for supporting the blade to extend longitudinally of the travel of the carriage; and means for adjusting the supporting-means transversely of the beam for measuring different portions of the blade-wall.

18. The combination with apparatus mounted on a carriage for movement longitudinally, and measuring the wall-thickness, of hollow propeller blades including a beam mounted on the carriage for longitudinal movement therewith and adapted to extend into the blade for contacting the inner face of the blade-wall; of means for supporting the blade to extend longitudinally of the travel of the carriage; and means for adjusting the supporting-means transversely of the beam for measuring different portions of the blade-wall; and means for adjusting the supporting-means longitudinally.

19. The combination with apparatus mounted on a carriage for movement longitudinally, and measuring the wall-thickness, of hollow propeller blades including a beam mounted on the carriage for longitudinal movement therewith and adapted to extend into the blade for contacting the inner face of the blade-wall; of a device for supporting the shank of the blade; a device for supporting the tip of the blade; and means for adjusting the tip supporting device transversely to the beam and pivoting the shank supporting device, for measuring the wall-thickness of different portions of the walls of the blades.

20. The combination with apparatus mounted on a carriage for movement longitudinally, and measuring the wall-thickness, of hollow propeller blades including a beam mounted on the carriage for longitudinal movement and adapted to extend into the blade for contacting the inner face of the blade-wall; of a device for supporting the shank of the blade; a device for supporting the tip of the blade; and means for adjusting the tip supporting device transversely and pivoting the shank supporting device to support the blade angularly relatively to the beam, for measuring the wall-thickness of different portions of the walls of the blades.

21. The combination with apparatus mounted on a carriage for movement longitudinally, and measuring the wall-thickness, of hollow propeller blades including a beam mounted on the carriage for longitudinal movement and adapted to extend into the blade for contacting the inner face of the blade-wall; of a device for supporting the shank of the blade; a device for supporting the tip of the blade; means for adjusting the tip supporting device transversely relatively to the beam and pivoting the shank supporting device for measuring the wall-thickness of different portions of the walls of the blades; and means for relatively adjusting the devices longitudinally for holding blades of different lengths.

22. The combination with apparatus mounted on a carriage for movement longitudinally of and measuring the wall-thickness of hollow propeller blades including a beam mounted on the carriage for longitudinal movement and adapted to extend into the blade for contacting the inner face of the blade-wall; of a device for supporting the shank of the blade; a device for supporting the tip of the blade; and means for adjusting the tip supporting device transversely and angularly relatively to the beam and pivoting the shank supporting device, for measuring the wall-thickness of different portions of the walls of blades; and means for adjusting at least one of said devices longitudinally for supporting blades of different lengths.

23. The combination with apparatus mounted on a carriage for movement longitudinally, and measuring the wall-thickness, of hollow propeller blades including a beam mounted on the carriage for longitudinal movement and adapted to extend into the blade for contacting the inner face of the blade-wall; of a device for supporting the shank of the blade; a device for supporting the tip of the blade including a block having a groove for receiving the tip-end of the blade and spring-pressed jaws for engaging the blade adjacent to the blocks; and means for transversely adjusting the tip supporting device and pivotally supporting the shank supporting device.

24. Measuring apparatus for the wall-thickness of hollow propeller blades comprising: a gauge; contacts for engaging the inner and outer faces of the blade-wall; means for operating the gauge, controlled by the engagement of said contacts with the blade-wall; a vertically movable carrier on which the outer contact, the gauge, and the gauge-operating means are mounted; and means including screw means for shifting the carrier with the gauge, gauge-operating means, and the outer contact thereon, including an element for rotating the screw-means and a one-way slip-connection for preventing further movement of the carrier and limiting the pressure of the outer contact against the blade-wall.

25. Measuring apparatus for the wall-thickness of hollow propeller blades comprising: a gauge; contacts for engaging the inner and outer faces of the blade-wall; means for operating the gauge controlled by the engagement of said contacts with the blade-wall; a vertically movable carrier on which the outer contact, the gauge, and the gauge-operating means are mounted; and means for shifting the carrier with the gauge, gauge-operating means, and the outer contact thereon, including a screw, an element for rotating the screw and a one-way slip-connection between said element and the screw for preventing further movement of the carrier and limiting the pressure of the outer contact against the blade-wall.

26. Measuring apparatus for the wall-thickness of hollow propeller blades comprising: a gauge; contacts for engaging the inner and outer faces of the blade-wall; means for operating the gauge controlled by the engagement of said contacts with the blade-wall; a vertically movable carrier on which the outer contact, the gauge, and the gauge-operating means are mounted; a stop controlled by the contact engaging the inner face of the blade, engageable by the operating-means; a signal device; and means controlled by the contact engaging the outer face of the blade, for controlling said signal.

27. Measuring apparatus for the wall-thickness of hollow propeller blades comprising: a gauge; contacts for engaging the inner and outer faces of the blade-wall; means for operating the gauge controlled by the engagement of said contacts with the blade-wall; a vertically movable carrier on which the outer contact, the gauge, and the gauge-operating means are mounted; a stop controlled by the contact engaging the inner face of the blade, engageable by the operating-means; a pair of signaling devices; means controlled by the contacts engaging the inner and outer faces of the blade for controlling one of said signaling devices; and means controlled by the continued movement of the vertical movable carriage after the contact engages the outer face of the blade for controlling the other signaling device.

DWILLARD J. DAVIS.

No references cited.